US005403972A

United States Patent [19]

Valentine, Sr.

[11] Patent Number: 5,403,972

[45] Date of Patent: Apr. 4, 1995

[54] DRUM RHYTHMS TRIGGER PADS MOUNTED ON BODY AND NECK OF GUITAR-SHAPED HOUSING

[76] Inventor: Adrian Valentine, Sr., 2626 Cupid St., New Orleans, La. 70131

[21] Appl. No.: 163,285

[22] Filed: Dec. 7, 1993

[51] Int. Cl.[6] .................... G01H 3/14

[52] U.S. Cl. .................... 84/730; 84/743

[58] Field of Search .................... 84/600, 644, 646, 670, 84/730, 743, 745, DIG. 30

[56] References Cited

U.S. PATENT DOCUMENTS

| | | | |
|---|---|---|---|
| 4,479,412 | 10/1984 | Klynas | 84/DIG. 12 X |
| 4,581,972 | 4/1986 | Hoshino . | |
| 4,867,028 | 9/1989 | Jones | 84/735 |
| 5,001,959 | 3/1991 | Kimpara | 84/635 |
| 5,042,356 | 8/1991 | Karch . | |
| 5,085,119 | 2/1992 | Cole . | |
| 5,095,799 | 3/1992 | Wallace et al. | 84/609 |
| 5,115,706 | 5/1992 | Aluisi . | |
| 5,121,668 | 6/1992 | Segan et al. | 84/646 |
| 5,157,213 | 10/1992 | Kashio et al. | 84/622 |
| 5,223,658 | 6/1993 | Suzuki | 84/663 |

*Primary Examiner*—William M. Shoop, Jr.
*Assistant Examiner*—Jeffrey W. Donels
*Attorney, Agent, or Firm*—John R. Flanagan

[57] ABSTRACT

A musical instrument includes a guitar-shaped housing and a drum rhythms triggering assembly mounted thereon. The guitar-shaped housing has a body and an elongated neck attached at one end of the body and extending outwardly therefrom. The drum rhythms triggering assembly includes a first plurality of trigger pads mounted at selected locations on an exterior surface of the housing body and a second plurality of trigger pads mounted at selected locations on an exterior surface of the housing neck. Also, the drum rhythms triggering assembly includes a plurality of electrical conductors and a connector mounted on the housing body and neck in an arrangement for electrically connecting electro-mechanical transducers of the first and second pluralities of trigger pads with an external electrical signal processing system capable of generating different drum rhythms in response to contact with different selected ones of the trigger pads by a player's fingers.

10 Claims, 2 Drawing Sheets

DRUM RHYTHMS TRIGGER PADS MOUNTED ON BODY AND NECK OF GUITAR-SHAPED HOUSING

BACKGROUND OF THE INVENTION

1. Field of the Invention

The present invention generally relates to musical instruments and, more particularly, is concerned with a drum rhythms triggering assembly for mounting on a body and neck of a guitar-shaped housing.

2. Description of the Prior Art

Various proposals have been made in prior art to construct an electronical drum or to convert a conventional drum into an electronically triggered drum. Some respresentative examples of such proposals are found in U.S. patents to Hoshino (U.S. Pat. No. 4,581,972), Karch (U.S. Pat. No. 5,042,356) and Aluisi (U.S. Pat. No. 5,115,706).

In the Hoshino patent, a drum pad is provided on a plate member which is mounted in an upright position by a mounting structure. A microphone is mounted on the plate member on an opposite side thereof from the drum pad. In the Karch patent, a circular panel supporting a plurality of transducers thereon is supported beneath the drumhead of a conventional drum. Wire leads connect the transducer to jacks mounted in the sidewall of the drum. In the Aluisi patent, a drum assembly includes a housing and a central drum pad and a plurality of drum pads arranged on the housing in an encompassing relation about the central drum pad. Electronic percussion synthesizers are operably connected to each drum pad for producing predetermined percussion sounds in response to the striking of the drum pads.

While the devices of these patents may constitute adaptations of drums that are playable by persons who have been trained to play conventional drums, they do not appear to accommodate the needs of players of other musical instruments, such as guitars, who may wish to make drum musical but are confortable with the conventional techniques of drum playing.

Consequently, a need exists for a different approach to providing a non-conventional drum musical instrument to accommodate players of other musical instruments.

SUMMARY OF THE INVENTION

The present invention provides a guitar-shaped musical instrument for producing drum rhythms being designed to satisfy the aforementioned need. The musical instrument of the present invention allows any musician the opportunity to play drum rhythms by taping on piezoelectric trigger pads applied on a guitar-shaped housing to electrically trigger the different rhythms of a typical drum set.

Accordingly, the present invention is directed to a musical instrument which comprises a guitar-shaped housing and a drum rhythms triggering assembly mounted thereon. The guitar-shaped housing has a body and an elongated neck attached at one end of the body and extending outwardly therefrom. The drum music triggering assembly includes a first plurality of trigger pads mounted at selected locations on an exterior surface of the body and a second plurality of trigger pads mounted at selected locations on an exterior surface of the neck. Each trigger pad contains an electromechanical transducer adapted to generate an electrical signal in response to contact by a player's fingers with the pads.

Also, the drum music triggering assembly includes a plurality of electrical conductors and connectors mounted on the body and neck of the guitar-shaped housing in an arrangement for electrically connecting the first and second pluralities of trigger pads with an external electrical signal processing system capable of generating different drum rhythms in response to the contact by the player's fingers with different selected ones of the trigger pads.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
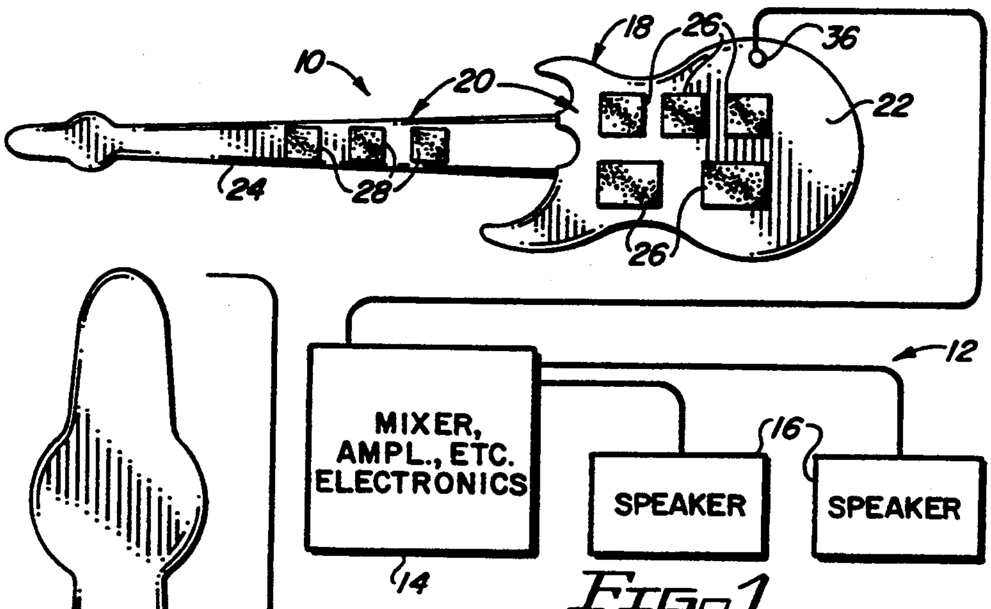
FIG. 1 is a diagrammatic view of a musical instrument of the present invention which can be played so as to trigger the generation of drum rhythms by an external electrical signal processing system being shown in a general block diagram.
Figure 4:
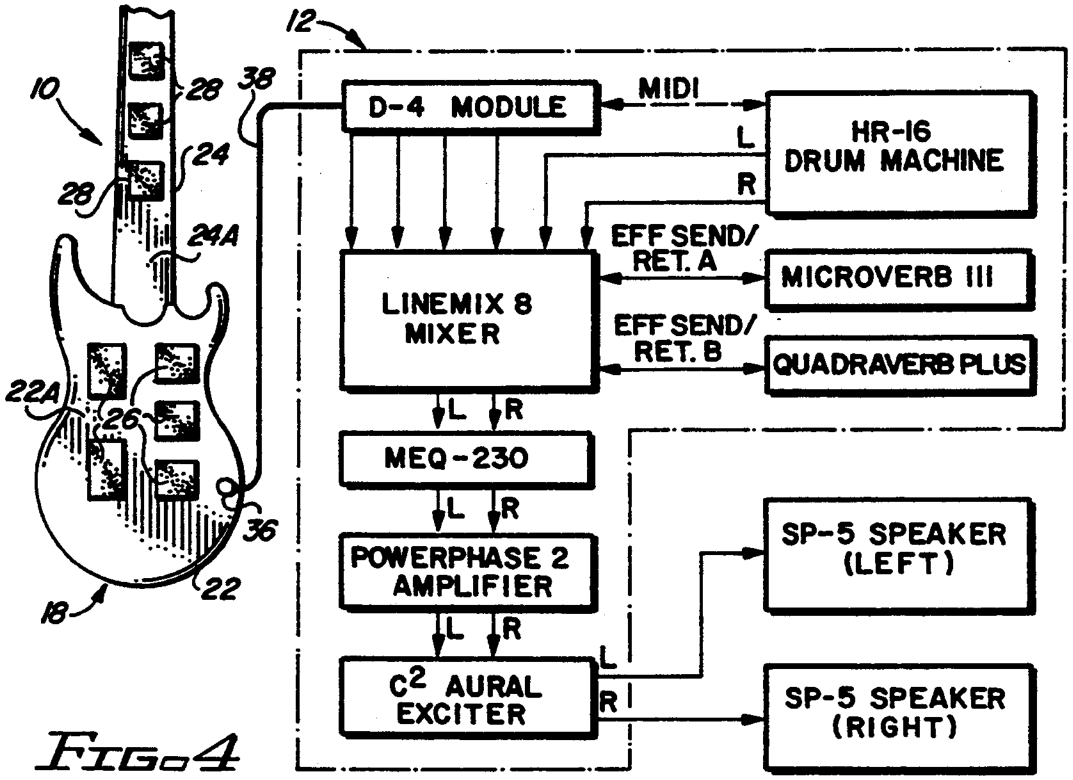
FIG. 4 is another diagrammatic view similar to FIG. 1 but showing an example of the external electrical signal processing system in a more detailed block diagram.

Referring to the drawings, and particularly to FIG. 1, there is illustrated a musical instrument, generally designated 10, of the present invention. The musical instrument 10 is connected to an external electrical signal processing system 12 which includes various electronics 14 and a plurality of speakers 16 being operable to produce drum rhythms in response to triggering signals generated by a musician playing the musical instrument 10. A detailed labeled block diagram of one example of an arrangement of components making up the electronics 14 is shown in FIG. 4. Since the electronics 14 forms no part of the present invention, it need not be further described herein in order for one of ordinary skill in the art to gain a complete and thorough understanding of the present invention.

Referring to FIGS. 1-5, the musical instrument 10 basically includes a guitar-shaped housing 18 and a drum rhythms triggering assembly 20 mounted thereon. The guitar-shaped housing 18 has a main body 22 and an elongated neck 24 attached at one end of the body 22 and extending outwardly therefrom.

The drum rhythms triggering assembly 20 includes a first plurality of trigger pads 26 mounted at selected locations on an exterior surface 22A of the housing body 22 and a second plurality of trigger pads 28 mounted at selected locations on an exterior surface 24A of the housing neck 24. Each of the trigger pads 26, 28 has the same basic construction which includes an electro-mechanical, for example a piezoelectric, transducer 30 and an outer cover 32 of resilient compressible material, such as rubber, covering the transducer 30.

Figure 5:
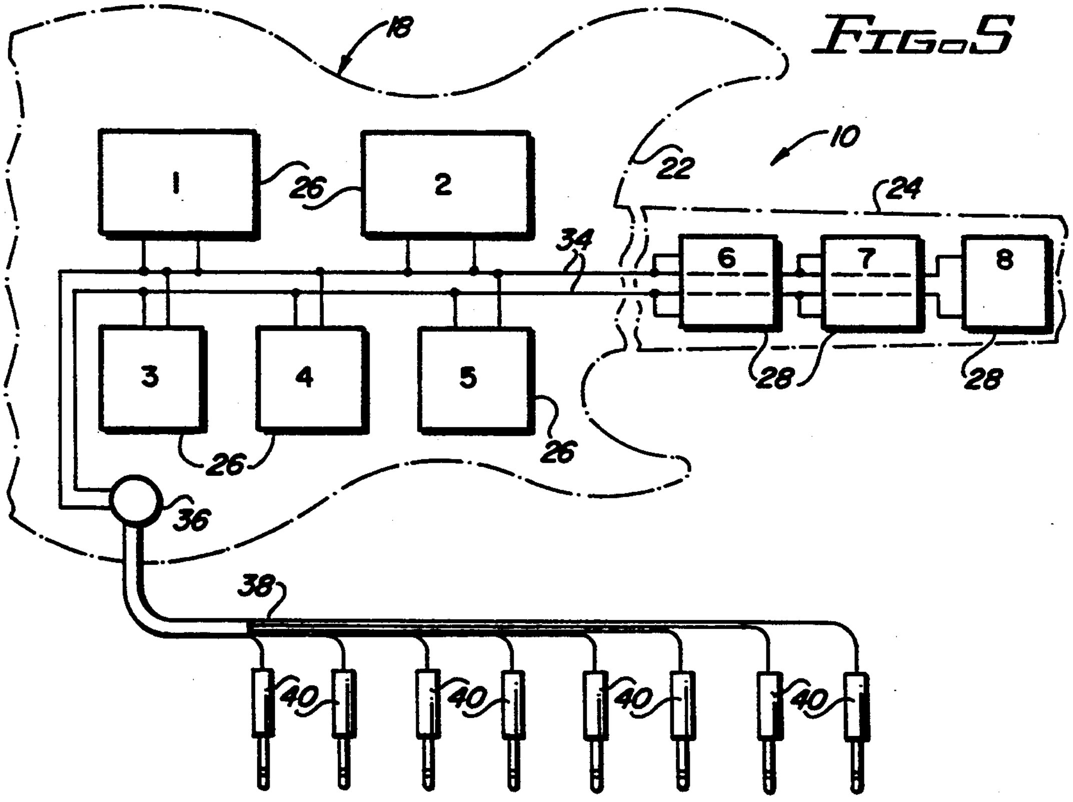
FIG. 5 is a detailed diagram of an arrangement of electrical conductors and connectors of the drum music triggering assembly connected with first and second pluralities of trigger pads of the assembly.

Referring to FIG. 5, the drum rhythms triggering assembly 20 also includes a plurality of electrical conductors 34 mounted on the body 22 and neck 24 of the guitar-shaped housing 18 and an electrical connector 36 mounted on the body 22 of the housing 18. The conductors 34 are electrically connected to the electro-mechanical transducers 30 (being identified in FIG. 5 as transducers 1–8) of the first and second pluralities of trigger pads 26, 28. The electrical conductors 34 are, in turn, electrically connected to the connector 36.

Figure 3:
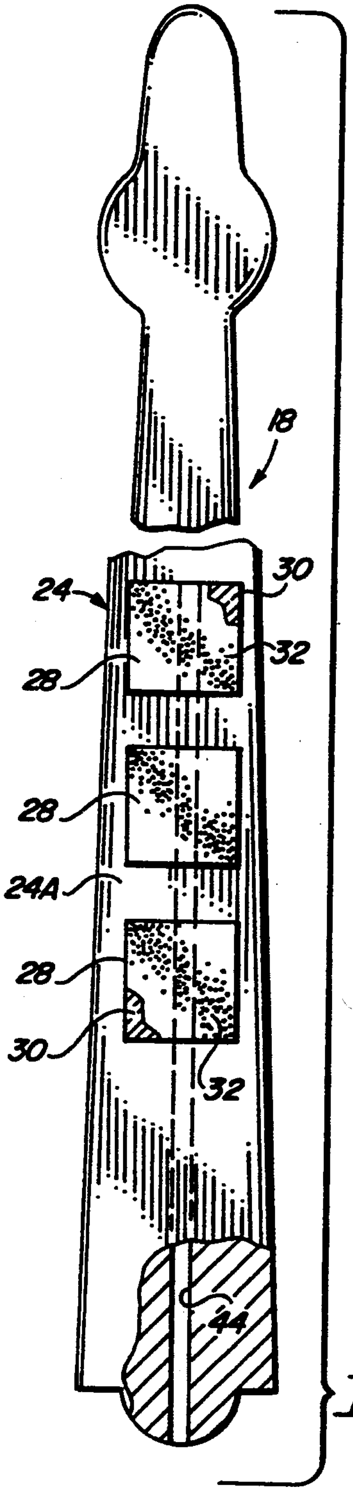
FIG. 3 is an enlarged plan view of a neck of the guitar-shaped housing of the musical instrument.
Figure 2:
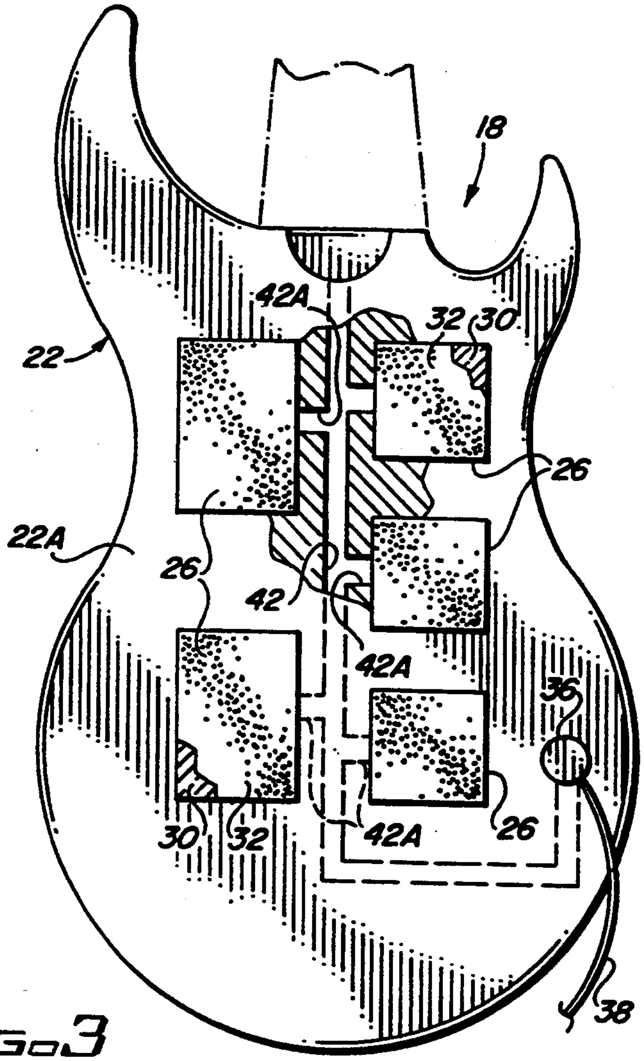
FIG. 2 is an enlarged plan view of a body of a guitar-shaped housing of the musical instrument.

The musical instrument 10 can be electrically connected to the external electrical signal processing system 12 in any suitable manner, such as by a plurality of lead wires 38 terminated by plugs 40. The external system 12 is capable of generating different drum rhythms (bass, snare, etc.) in response to a tapping type of contact by a player's fingers with different selected ones of the trigger pads 26, 28. Respective grooves or channels 42 and 44 are made below the exterior surfaces 22A and 24A of the body 22 and neck 24 for routing the electrical conductors 34 between the electical connector 36 and various ones of the trigger pads 26, 28. As seen in FIGS. 2 and 3, the channels 42 and 44 of the respective body 22 and neck 24 of the guitar housing 18 are defined and extend in general alignment with one another. The plurality of trigger pads 26 on the body 22 are disposed in spaced adjacent relation to and along opposite sides of the channel 42, whereas the plurality of trigger pads 26 on the neck 24 are disposed in overlying relation to the channel 44. Short branches 42A extend from the channel 42 to the respective trigger pads 26 on the body 22.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A musical instrument, comprising:

(a) a housing;

(b) a plurality of trigger pads mounted at selected locations on an exterior surface of said housing, each of said trigger pads generateing an electrical signal in response to contact by fingers of a player with said trigger pads;

(c) means mounted in said housing for electrically connecting said plurality of trigger pads with an external means for receiving the electrical signals and generating different drum rhythms in response to the contact by the fingers of the player with different selected ones of said trigger pads; and (d) a channel defined in said housing below said external surface thereof for routing said means for electrically connecting said trigger pads with said external means, said trigger pads being disposed on said exterior surface of said body along opposite sides of said channel.

2. The instrument of claim 1 wherein each of said trigger pads includes an electro-mechanical transducer.

3. The instrument of claim 2 wherein each of said trigger pads also includes an outer layer of resilient compressible material covering said transducer and disposed on the exterior of said housing.

4. The assembly of claim 1 wherein each of said trigger pads includes a piezo-electric transducer.

5. The assembly of claim 1 wherein said electrical connecting means includes a plurality of electrical conductors and a connector mounted on said housing.

6. A musical instrument, comprising:

(a) a guitar-shaped housing having a body and an elongated neck mounted at one end to the body and extending therefrom; and (b) a drum rhythms triggering assembly including (i) a first plurality of trigger pads mounted at selected locations on an exterior surface of said body of said guitar-shaped housing, each of said trigger pads of said first plurality generating an electrical signal in response to contact by fingers of a player with said trigger pads, (ii) a second plurality of trigger pads mounted at selected locations on an exterior surface of said elongated neck of said guitar-shaped housing, each of said trigger pads of said second plurality generating an electrical signal in response to contact by fingers of a player with said trigger pads, and (iii) means mounted in said body and neck of said guitar-shaped housing for electrically connecting said first and second pluralities of trigger pads with an external means for receiving the electrical signals and generating different drum rhythms in response to contact by fingers of a player with different selected ones of said trigger pads;

(c) said body and neck of said guitar-shaped housing having respective channels defined therein below said external surfaces thereof for routing said means for electrically connecting said trigger pads with said external means, said trigger pads on said exterior surface of said body being disposed along opposite sides of said channel defined in said body, said trigger pads on said exterior surface of said neck being disposed in overlying relation to said channel defined in said neck, said respective channels being defined and extending in general alignment with one another.

7. The instrument of claim 6 wherein each of said trigger pads includes an electro-mechanical transducer.

8. The instrument of claim 6 wherein each of said trigger pads also includes an outer layer of resilient compressible material covering said transducer.

9. The instrument of claim 8 wherein each of said trigger pads includes a piezo-electric transducer.

10. The instrument of claim 6 wherein said electrical connecting means includes a plurality of electrical conductors and a connector mountable on said body and neck of said housing.

* * * * *